United States Patent
Sandei

(10) Patent No.: US 6,350,198 B1
(45) Date of Patent: Feb. 26, 2002

(54) TOMATO HARVESTER WITH IMPROVED DEVICES FOR FEEDING CUT PLANTS TO THE SHAKER

(75) Inventor: Luigi Sandei, Collecchio (IT)

(73) Assignee: FMC Italia S.p.A., Parma (IT)

( * ) Notice: Subject to any disclaimer, the term of this patent is extended or adjusted under 35 U.S.C. 154(b) by 0 days.

(21) Appl. No.: 09/565,344

(22) Filed: May 5, 2000

(51) Int. Cl.$^7$ .................... A01D 13/00; A01D 21/00; A01D 45/00
(52) U.S. Cl. ............................ 460/123; 460/144
(58) Field of Search ........................ 460/123, 113, 460/114, 119, 133, 147, 148, 149, 150, 901; 56/340.1, 228.1

(56) References Cited

U.S. PATENT DOCUMENTS

| | | | |
|---|---|---|---|
| 4,232,506 A | * 11/1980 | Studer | 56/327.1 |
| 4,335,570 A | * 6/1982 | Fitzmaurice | 56/327.1 |
| 4,915,671 A | * 4/1990 | Johnson | 460/59 |
| 4,965,993 A | * 10/1990 | Butler et al. | 56/327.1 |
| 5,316,519 A | * 5/1994 | Johnson | 460/96 |
| 5,480,353 A | * 1/1996 | Garza, Jr. | 460/148 |
| 5,846,129 A | * 12/1998 | Dragt | 460/144 |
| 5,908,352 A | * 6/1999 | Meester et al. | 460/113 |

* cited by examiner

Primary Examiner—Robert E. Pezzuto
Assistant Examiner—Árpád F. Kovács
(74) Attorney, Agent, or Firm—Notaro & Michalos P.C.

(57) ABSTRACT

A tomato harvester includes loading systems designed to receive cut plants and direct them into the harvester, shaker devices constituted by a number of sets of rods fitted radially on a common rotating support which are subject to the action of systems designed to make them vibrate and a feed belt designed to receive the plants from the loading systems and convey them to the shaker, following the route of the shaker rods. A number of support elements constituted by hoses or the like made of flexible material, guided by rings fitted to the ends of a set of arms integral with the conveyor belt are fitted in staggered positions in relation to the shaker rods so as to form a grid that supports the plants at a certain distance from the feed belt. Other systems for the harvester are designed to receive and discharge the plants that have been stripped of fruit.

3 Claims, 3 Drawing Sheets

TOMATO HARVESTER WITH IMPROVED DEVICES FOR FEEDING CUT PLANTS TO THE SHAKER

FIELD AND BACKGROUND OF THE INVENTION

This invention relates to a tomato harvester of the type comprising systems designed to cut the plants at ground level, systems designed to introduce the cut plants into the harvester, shaker systems designed to detach the tomatoes from the plants, and systems designed to discharge the plants after separation of the tomatoes, which said harvester also includes improved devices for feeding the plants to the shaker. In particular, the harvester in accordance with the invention is fitted with a conveyor belt which receives the plants from the loading devices and accompanies them along the entire section of the route in which they are subjected to the action of the shaker; the route of the belt follows the contour of the shaker, which includes systems designed to keep the plants slightly raised above the said belt to allow more effective treatment by the shaker.

In modern tomato harvesters the plants are cut near ground level by a header fitted to the front of the harvester and fall onto a loading belt that conveys them into the harvester, which contains shakers that separate the tomatoes from the plant, which is then discharged onto the ground.

The shakers usually consist of a number of discs fitted to a common shaft, a set of rods being fitted radially to the said discs. The discs are made to rotate around their own axis, while the rods are made to vibrate so that they shake the plants, causing the tomatoes to be detached.

The ends of the rods therefore follow a circular route, and the belt that transports the plants follows the same route for a certain distance so that the plants can be engaged by the shaker rods.

The efficacy of these devices is sometimes limited, however, because the shaking action of the rods is performed less strongly on the tomatoes that rest directly on the conveyor belt, which are therefore not always detached from the plant.

The action of the rods is far stronger if the plants are kept slightly raised above the belt so that they can be engaged more easily by the shaker rods.

Some of the more recent harvesters are equipped with a grid consisting of a number of parallel metal bars fitted above the belt that feeds the plants to the shaker, which are inserted between the various sets of rods to keep the plants raised above the conveyor belt, thus improving the efficiency of the shakers.

However, although this system has improved the prior state of the art, it is still not wholly effective, involves some complications in manufacture and higher costs, and constitutes an area in which mud and debris accumulate when working on wet ground.

SUMMARY OF THE INVENTION

The problem described above is now solved by this invention, which relates to a tomato harvester in which the belt that conveys the tomatoes to the shakers consists of a grid belt with a number of supports fitted to its rods, each of which supports is fitted with a ring through which a hose passes.

The set of hoses constitutes a kind of supporting grid that follows the route of the belt at a distance from it, keeping the plants raised above the belt when they pass the shaker to increase its efficacy.

BRIEF DESCRIPTION OF THE DRAWINGS

This invention will now be described in detail, by way of example but not of limitation, by reference to the annexed figures in which.

DESCRIPTION OF THE PREFERRED EMBODIMENT

Figure 1:
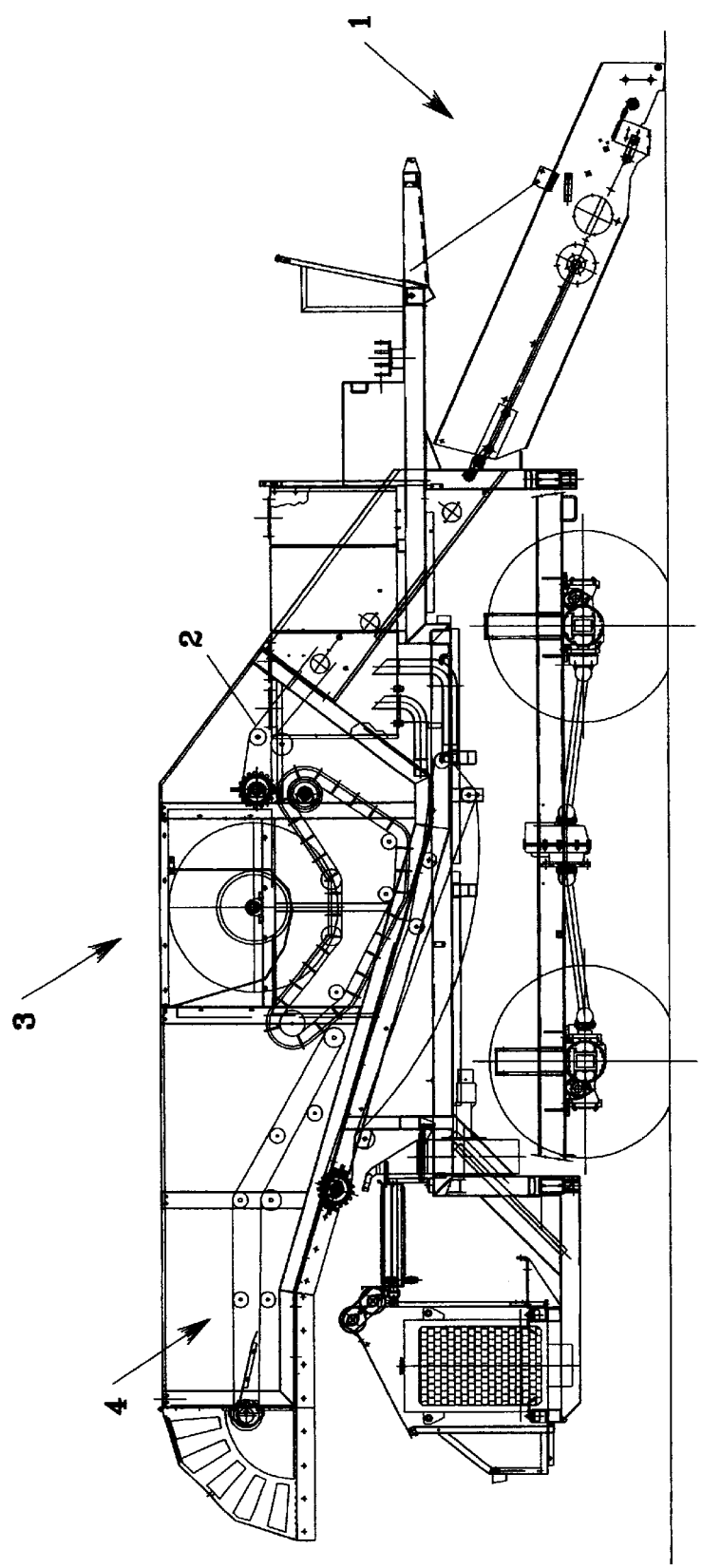
FIG. 1 schematically illustrates the side view of a tomato harvester in accordance with the invention

By reference to FIG. 1, a tomato harvester in accordance with the invention is fitted at the front with a header assembly indicated as 1, which cuts the plants and directs them onto a loading belt 2, which in turn discharges them at shakers 3.

Here the tomatoes are separated from the plants; the tomatoes are collected and automatically conveyed to final containers, while the plants are discharged onto the ground by a belt 4. The structure of the harvester is already known, and a detailed description of it is therefore not required here.

Figure 2:
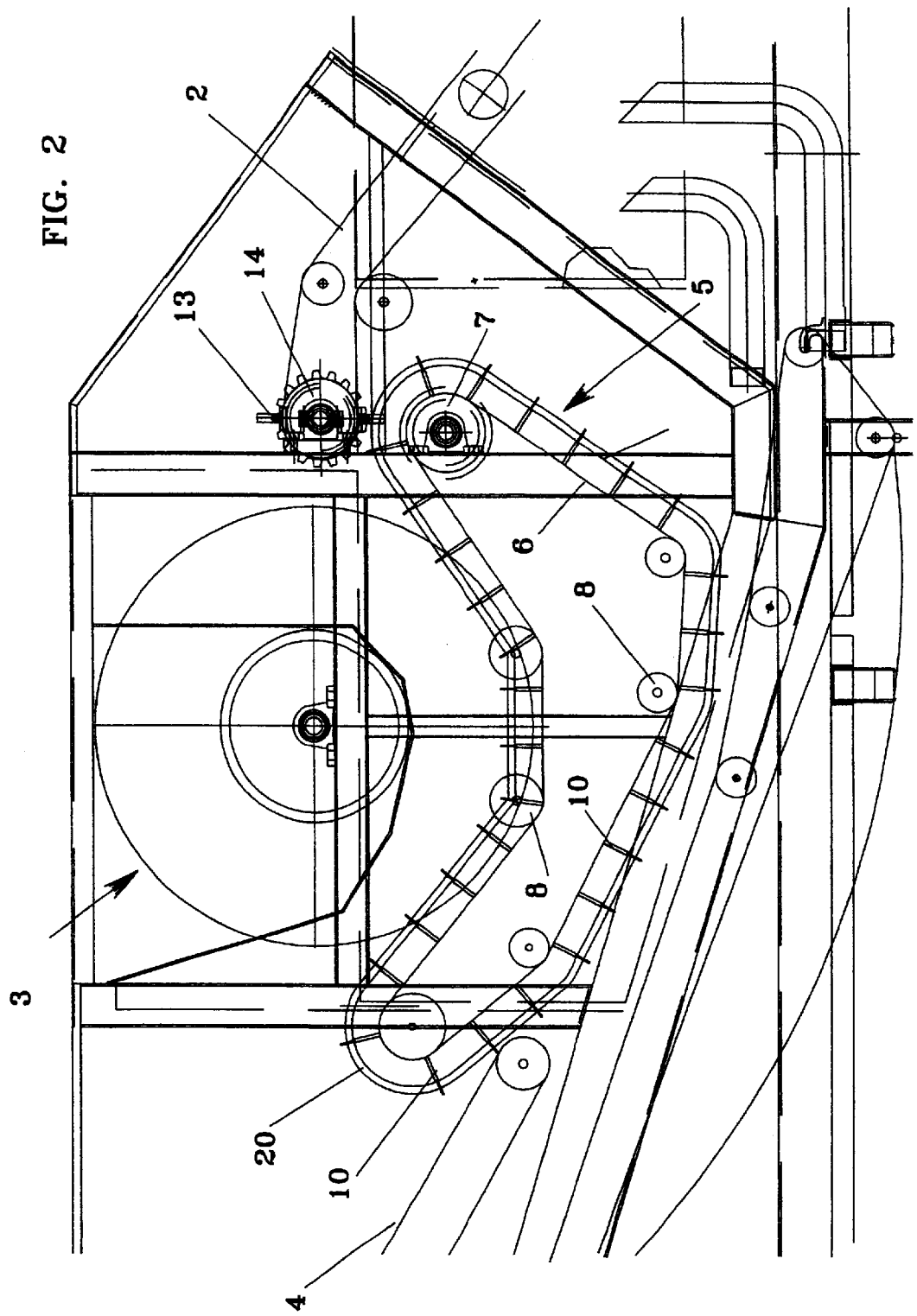
FIG. 2 is an enlarged detail of FIG. 1, showing the devices that feed the plants to the shaker

In accordance with the invention (see FIG. 2), a feed belt 5 is fitted immediately downstream of loading belt 2; feed belt 5 receives the plants from belt 2 and conveys them to the shaker, follows the circular route described by the ends of the shaker rods for a certain distance, and then discharges the plants onto ejector belt 4.

Feed belt 5 basically consists of a conveyor belt with wide mesh 6, fitted to a drive roller 7 and a number of guide rollers and stop rollers 8.

Figure 3:
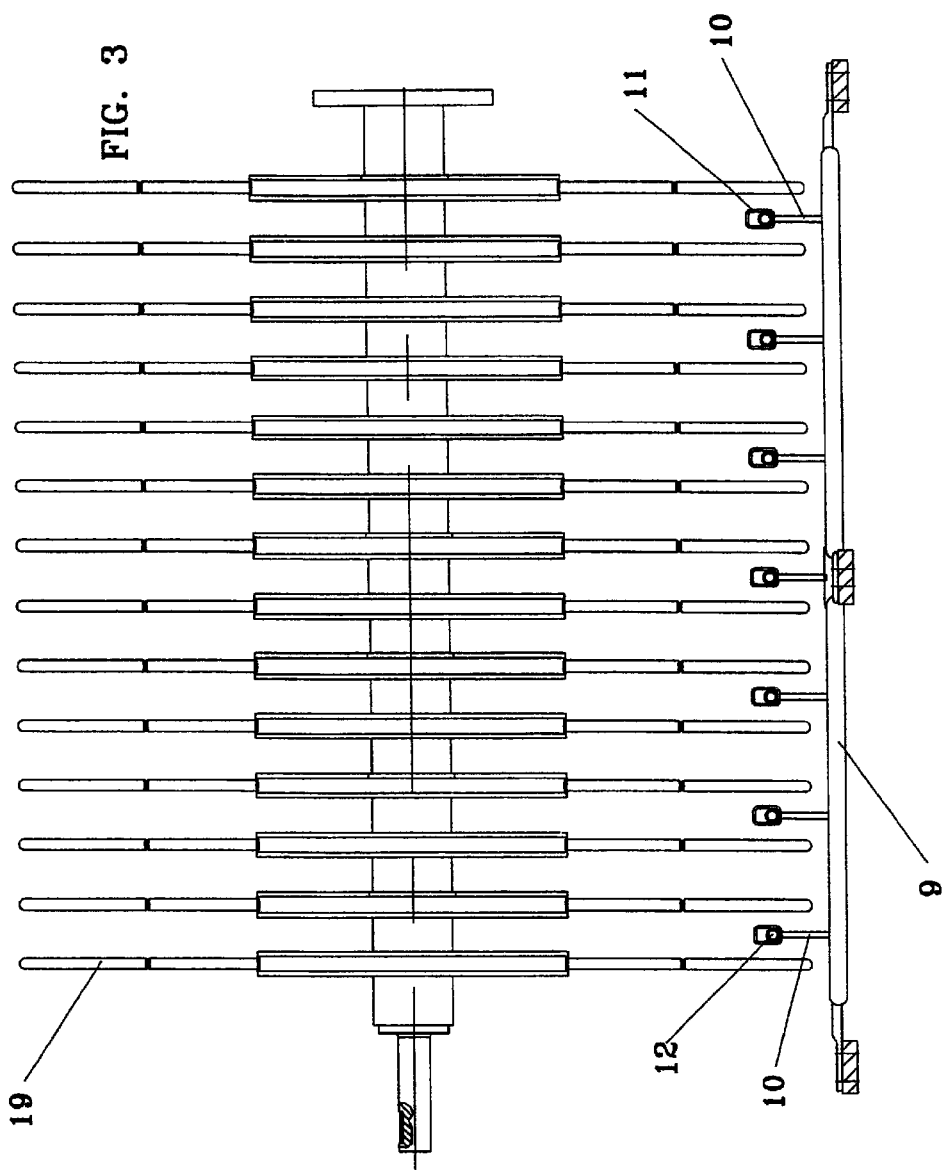
FIG. 3 is a view of a shaker with the plant feed devices

A set of supports or arms 10 are fitted to rods 9 (see FIG. 3) which constitute the structure of feed belt 5; the said supports project from the belt, and a ring or the like 11 is fitted to their upper end.

Arms 10 are fitted to rods 9 in such a way that they are staggered in relation to shaker rods 19.

A number of flexible ropes, cables or hoses 12 are fitted to belt 5; the hoses are inserted through rings 11 and therefore follow the route of belt 5, but remain at a distance from belt 5 equal to the height of arms 10.

Loading belt 2 is fitted with several rows of fingers 13 which project outwards and engage the cut plants to prevent them from sliding backwards along the inclined belt when they are loaded into the harvester. A roller 14, which turns in the immediate vicinity of feed belt 5, is fitted to the top end of loading belt 2.

In this way, arms 10 with rings 11 and hoses 12 are inserted between fingers 13 of the loading belt, thus preventing some of the plants from being dragged backwards by belt 2 when its route is reversed.

During the operation of the harvester the plants are cut by the header and fall onto loading belt 2, which raises them and directs them into the harvester. There, at the exit from belt 2, the plants fall onto feed belt 5 which conveys them to the shakers.

In this part of the route the plants are kept raised above belt 5, resting on hoses 12 which follow the route of the belt; the set of hoses constitutes a kind of grid which follows the route of the feed belt and keeps the plants raised above it.

In this section of the route the plants are subjected to energetic action by the shakers which causes the tomatoes to be detached from the plants and fall through the mesh of the belt onto the collector systems below. At the exit from the shaking area, the plants are discharged from belt 5 onto belt 4 which moves at a faster speed, with the result that the plants are immediately carried away from belt 5 with no risk of their returning to the processing cycle.

Figure 5:
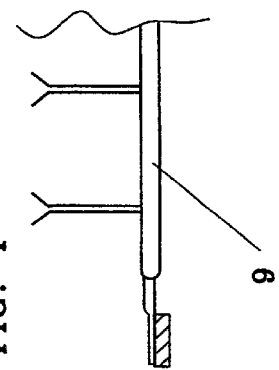
FIGS. 4 and 5 illustrate a detail of a different form of embodiment of the invention.
Figure 4:
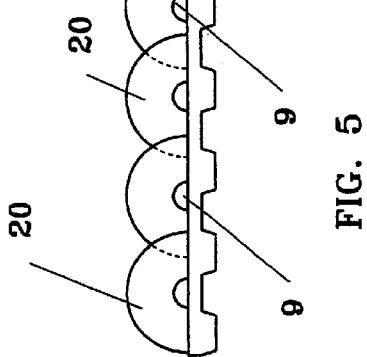

Various forms of embodiment are possible in the ambit of the same concept. For example, arms 10 with hoses 12 could be replaced by a set of rigid supports such as metal bars bent into an arch shape, semicircular plates or the like, integral with rods 9, as shown in FIGS. 4 and 5 and indicated by number 20.

An expert in the field could devise numerous modifications and variations, all of which should be deemed to fall within the scope of this invention.

What is claimed:

1. In a tomato harvester having a system for picking up and introducing cut plants with tomatoes into the harvester, a shaker for detaching tomatoes from the cut plants and a system for receiving cut plants without tomatoes at an exit of the shaker and for discharging the cut plants without tomatoes onto the ground, an improvement comprising:

a feed belt for receiving the cut plants with tomatoes from the system for picking up and introducing the cut plants, the feed belt conveying the cut plants with tomatoes to the shaker, the shaker having a route and the feed belt following part of the route of the shaker to accompany the cut plants along the part of the route;

the feed belt comprising a conveyor belt, a plurality of support arms extending outwardly from the conveyor belt and toward the shaker along the part of the route of the feed belt following the route of the shaker, a ring at an outer end of each arm and a plurality of parallel flexible elongated members seated in the rings and extending parallel to a movement direction of the feed belt for maintaining the cut plants at a location raised from the conveyer belt for allowing the shaker to act between the flexible members to remove tomatoes from the cut plants.

2. The improvement of claim 1 wherein the shaker comprises a plurality of rods moveable parallel to the elongated flexible members, the shaker rods extending between the parallel flexible elongated members so that the rods act on the cut plants while the cut plants are raised above the conveyer belt to remove tomatoes from the cut plants.

3. The improvement of claim 2 wherein the elongated flexible members comprise one of ropes, cables and hoses.

* * * * *